Dec. 19, 1944.          F. HODSON ET AL          2,365,194
             METHOD OF AND MEANS FOR REDUCING ORES
             Filed July 19, 1941          3 Sheets-Sheet 1

INVENTORS
Frank Hodson
Paul A. Hirsch
Jarvis C. Marble
their ATTORNEY

Dec. 19, 1944.  F. HODSON ET AL  2,365,194
METHOD OF AND MEANS FOR REDUCING ORES
Filed July 19, 1941  3 Sheets-Sheet 2
Fig.2.
Fig.3.
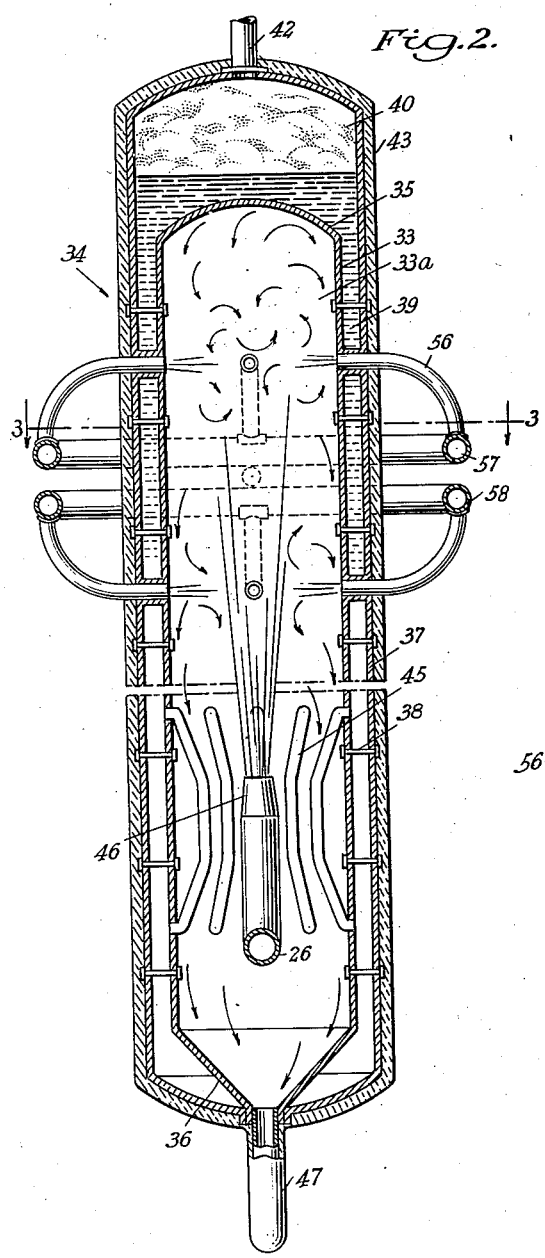
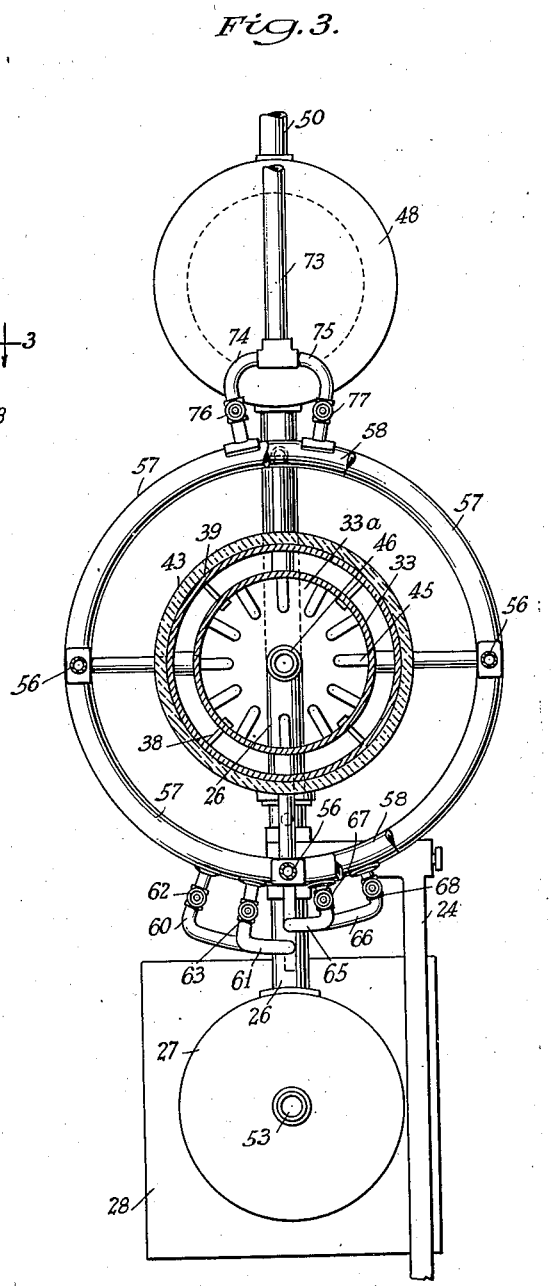
INVENTORS
Frank Hodson
Paul A. Hirsch
BY
their ATTORNEY

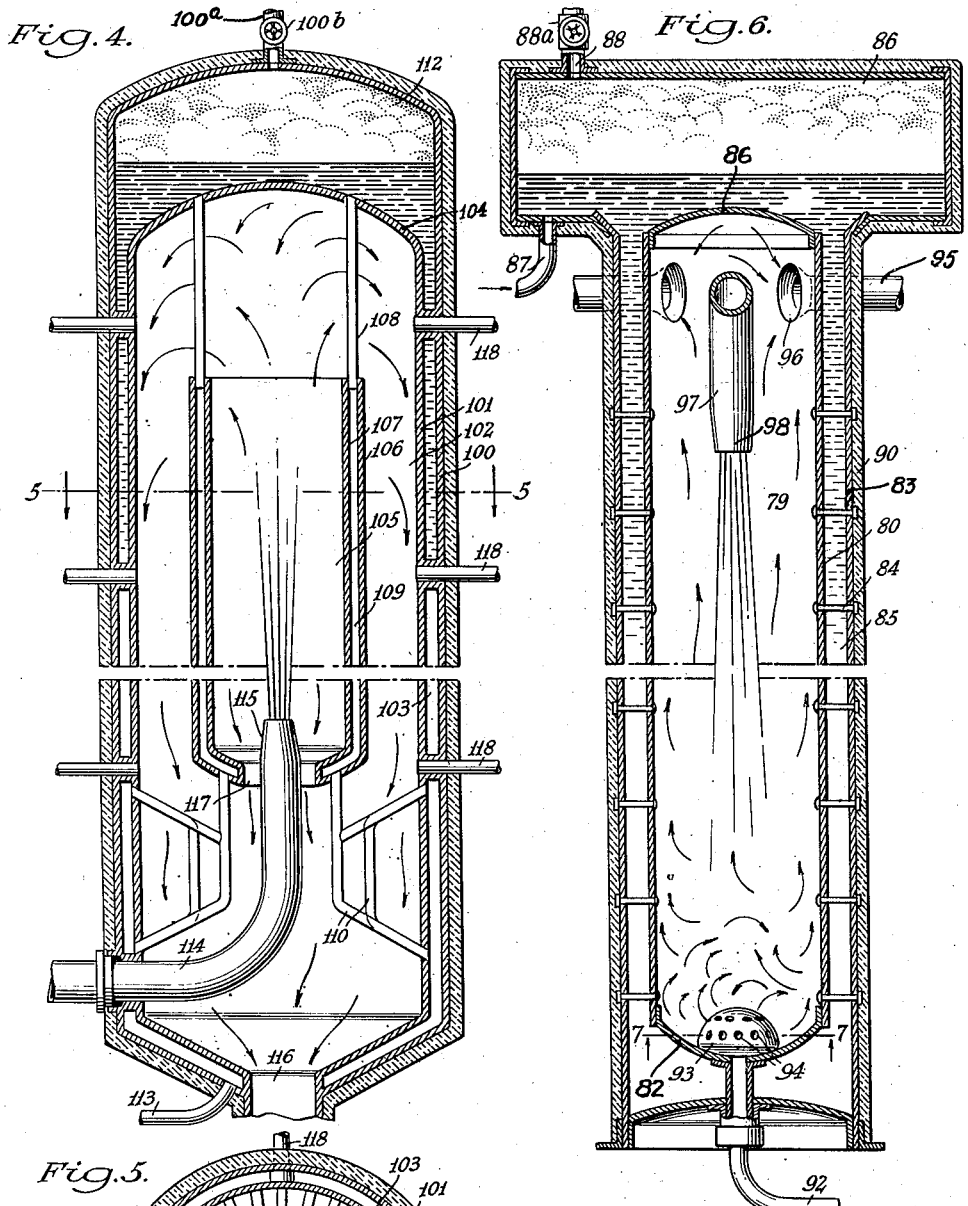

Patented Dec. 19, 1944

2,365,194

UNITED STATES PATENT OFFICE 2,365,194

METHOD OF AND MEANS FOR REDUCING ORES

Frank Hodson, Elmhurst, and Paul A. Hirsch, New York, N. Y., assignors to American Ore Reduction Corporation, New York, N. Y., a corporation of Delaware Application July 19, 1941, Serial No. 403,090

23 Claims. (Cl. 75—26)

This invention relates to the reduction or beneficiation of ores or other metal bearing materials such as mill scale (iron oxide) and other industrial wastes, and it has for its general object to provide improved methods of and means for reducing such metal bearing materials to a desired state.

In accordance with one phase of the present invention, the above as well as other objects are attained by treating the material in a turbulent stream of reducing gas in such a finely divided state that it is entrained by and carried concurrently in suspension therewith through and out of the reducing zone of a furnace, and by so conditioning the stream, for example, by regulating the temperature and composition thereof, as to insure the reduction or beneficiation of the material to the desired state, which is usually but not necessarily that of substantially pure metal powder without any appreciable sticking of the reduced material during its travel through and out of the reducing zone, and to prevent a back reaction or reoxidization of the reduced material during and after the period of reaction without using excessive amounts of reducing agent.

In accordance with another phase of the invention, improved reducing furnace structure and controls therefor are provided to insure the desired degree of turbulence of the stream and to enable the desired conditioning of the stream to be readily secured and maintained.

The reducing gas required to effect the desired degree of reduction of the material may be created in the furnace or it may be introduced therein in whole or in part from a suitable outside source. In the event it is desired to create the reducing gas in the furnace, a reducing agent such as coal or other carbonaceous fuel is introduced into the furnace together with a supply of air or other oxidizing gas insufficient to effect complete combustion of the reducing agent. The air thus introduced into the furnace is preferably preheated near to or even above the ignition temperature of the reducing agent employed, this being desirable since it aids in speeding up the reaction by promoting the rapid reaction of the air with the agent to form the desired reducing gas and by insuring quick heat penetration of the particles being reduced.

In the event it is desired to introduce reducing gas into the furnace from an outside source hydrogen or other forms of like reducing gases may be employed, or if desired, the gas may be created outside the furnace by burning fuel with a quantity of air insufficient to effect complete combustion of the fuel or it may be created by cracking natural gas. Regardless of the source, however, the reducing gas is preferably introduced into the furnace in a highly preheated condition and it may be injected into the furnace alone or in combination with the powdered ore and air.

Treating the material to be reduced while in turbulent suspension in a finely divided state in the gas stream enables the reducing operation to go forward with extreme rapidity by virtue of the fact that the surface areas of the particles thus exposed to the action of the reducing gases are large as compared to the volume of the particles. In addition, other advantages are gained by treating finely divided material. For example, when ore is to be treated, and grinding is necessary to bring it to the desired degree of fineness, the metallic and the non-metallic constituents of the ore may be separated as a preliminary step in the process. It is to be noted, however, that even if the metallic and the non-metallic constituents of the ore are not separated as a preliminary step, the grinding to fine particle size still aids in speeding up the reducing operation by exposing more completely the metal bearing particles of the ore to the action of the reducing gas, whether they be in oxide or other form.

The size of the particles may be on the order of between 50 to 200 mesh or even smaller. In all cases, however, the particles must be related in size to the volume and velocity of the supporting gases which may vary between 4,000 to 10,000 feet per minute or more, as well as to the speed at which the heat can penetrate, so that they will travel in suspension therewith during the period of reaction. Likewise, the particles may be substantially colloidal in size and under these conditions iron ore, for example, may be injected with fuel oil as a colloidal mixture directly into the furnace with or without additional free carbon and reduced almost instantaneously to the desired state.

In the preferred process, the reduction operation is carried out at temperatures below the fusion or melting temperature of the metal, this being desirable to prevent the reduced particles from sticking together or to the walls of the furnace. Also, by holding the material below the fusion or melting temperature of the metal, the absorption of impurities by molten metal is avoided and other advantages are attained which are of particular value when metallic powder of the highest attainable degree of purity is desired as the end product.

Also, in the preferred process, the temperature and composition of the stream are so regulated that a reducing atmosphere prevails during and after the period of reaction, this being desirable to prevent reoxidization of the reduced particles.

In practicing the invention, many different types of furnaces may be employed, but we prefer to use furnaces wherein turbulences of the stream is effected by changing the character of flow of the stream as, for example, by changing its velocity or by reversing its direction of flow, this latter arrangement being preferred since it greatly reduces the length of the furnace required to effect the desired reduction. In addition, we prefer to use furnaces wherein the walls which define the reduction chamber are cooled at least in part and wherein the cooling effect is obtained by means of water jackets and/or screens which may be utilized for the generation of steam, the pressure of which may be controlled as desired, depending upon the character of the use to which the steam may be put and possibly in some instances to aid in controlling or regulating the furnace wall temperature which will, of course, vary with changes in the pressure of the water in the jacket and/or screens. The cooled walls of the furnace, in addition to preventing the adherence of reduced particles thereto during their travel through the furnace, also cool the gases in the stream and in so doing in the case of a reducing gas rich in carbon monoxide, create a more favorable gaseous equilibrium in the relationship of carbon monoxide and carbon dioxide and therefore make easier the maintenance of the desired reducing atmosphere. For example, at the elevated temperatures to which the stream is necessarily brought when reducing iron ore in accordance with the present invention, the amount of carbon monoxide needed to maintain the carbon monoxide, carbon dioxide gaseous equilibrium pressures is much higher than that required to maintain gaseous equilibrium pressures at lower temperatures. In consequence, by properly maintaining the temperature of the stream within desired temperature limits as it passes through the furnace during and after the period of reaction, it is possible to maintain a favorable carbon monoxide atmosphere with a minimum input of reducing agent.

For a more complete description of the invention, reference may be made to the accompanying drawings wherein:

Fig. 2 is an enlarged view, in section, taken along line 2—2 of Fig. 1;

Fig. 3 is a view, in section, taken along line 3—3 of Fig. 2;

Fig. 4 is a view in vertical section of a modified form of furnace embodying the invention;

Fig. 5 is a view in section taken along line 5—5 of Fig. 4;

Fig. 6 is a view in vertical section of another modified form of furnace embodying the invention; and Fig. 7 is a view in section taken along line 7—7 of Fig. 6.

Figure 1:
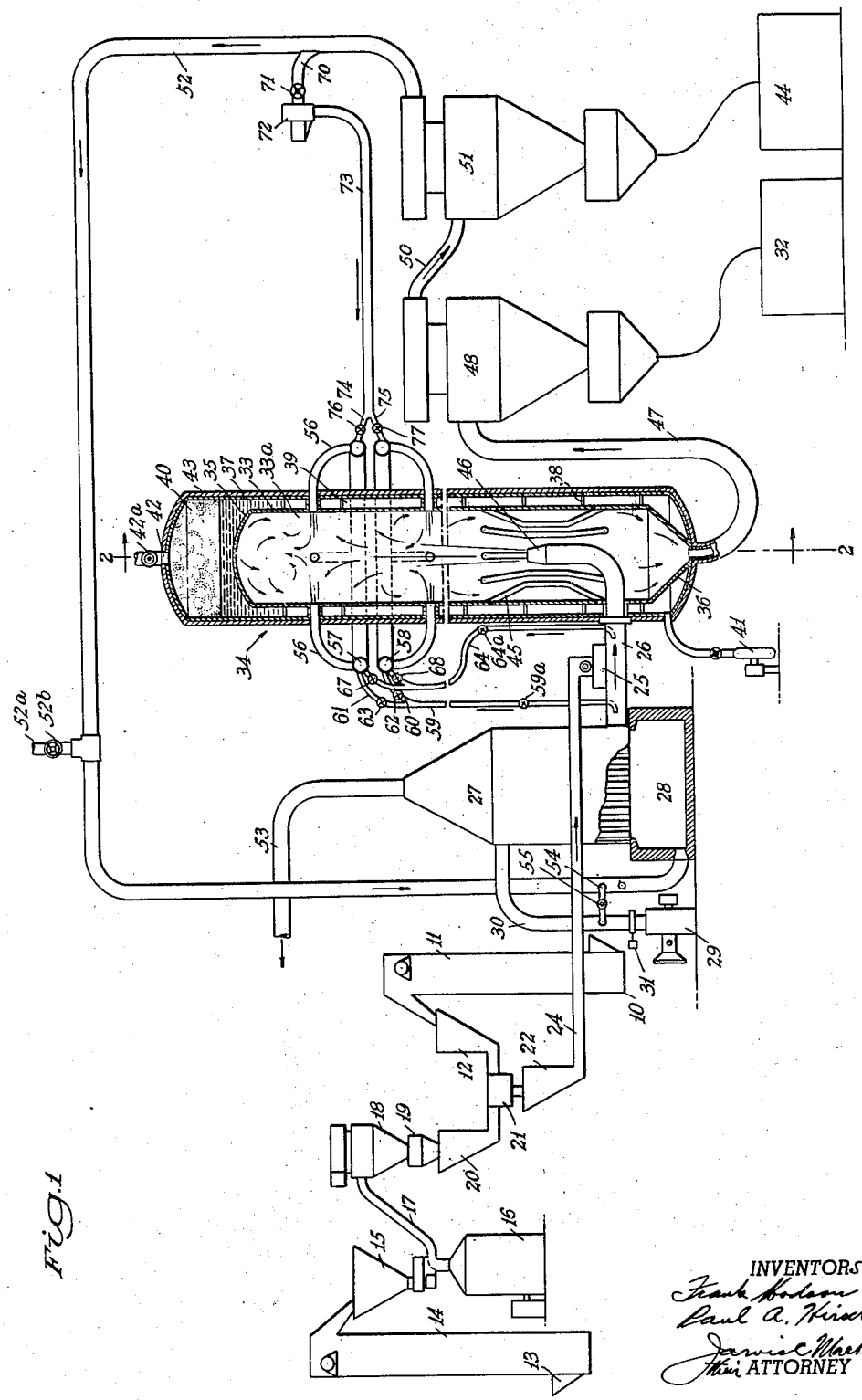
Fig. 1 is a diagrammatic view of apparatus that may be employed in practising the invention, a portion of the apparatus being broken away to more clearly show in section the relationship of the various parts of the reduction furnace, the recuperator furnace, and the preheater.

In describing the invention, the reduction of iron ore has been chosen for purposes of illustration, but as stated heretofore, other ores or materials containing metal in reduceable form may be treated in like manner and with equally favorable results.

In practising the invention, with the apparatus shown, the ore, after being ground to a finely divided state, is loaded into a bin 10 from whence it is carried upwardly by means of an elevator 11 and then discharged into a feeder 12. If desirable, the ore in its natural state may be loaded into the bin 10, in which case an ore pulverizer (not shown) would be interposed between the bin 10 and the feeder 12. In addition, the ore if magnetic in nature, may be concentrated before being loaded in the hopper as a preliminary step in the process. Also, in practising the invention with the apparatus shown, coal is preferably employed as the reducing agent and it is loaded into a bin 13 from whence it is carried upwardly by an elevator 14 and discharged into a hopper 15. From the hopper 15, the coal is discharged into a pulverizer 16 where it is reduced to powder form. From the pulverizer 16, the powdered coal is blown upwardly through a duct 17 into a collector 18 from whence it is fed downwardly through an intermediate hopper 19 into a coal feeder 20 located adjacent to the ore feeder 12. Feeders 12 and 20 are preferably of the well known vibrating type having gravimetric feed control devices which discharge the ore and the fuel in measured amounts into a mixer 21 wherein the ore and coal are thoroughly intermixed. From the mixer 21, the powdered material is fed into a third feeder 22 which is also advantageously of the vibrating type provided with a gravimetric feed control mechanism. From the feeder 22, the material is fed by any suitable means and at the desired rate through a pipe 24 and feed box 25 into a heat insulated main feed pipe 26 leading from a preheater 27 into a reduction furnace 34.

As the powdered material is fed into the main feed pipe 26 it is blown into the furnace 34 under the influence of a stream of highly preheated air created by a motor driven blower 29 and directed through the preheater 27 by means of an intermediate pipe 30 having a valve or damper 31 for controlling the amount of air thus delivered to the preheater 27. As the air stream passes through the preheater 27 it is heated near to or even above ignition temperature of the reducing agent in the manner subsequently to be described.

When coal is employed as the reducing agent the difficulties of handling it in a highly preheated state due to the volatiles and tars contained therein outweigh the advantages to be gained by preheating it, and consequently means for preheating the coal has not been shown. It is to be understood, however, that substantial advantages are obtainable by highly preheating either the reducing agent or the ore or both when using other combinations than those set forth in the present embodiment, such advantages including, for example, the acceleration of the initiation of the reaction in the furnace 34 and the tendency toward a more stable condition therein. Thus, if coke breeze were used as the reducing agent, which material may be readily handled in a highly preheated condition, preheating of the same and of the ore as well is to be preferred.

The form of reduction furnace preferably employed in carrying out the invention (see Figs. 1, 2 and 3) includes a vertically disposed steel drum 33 which defines a reduction chamber or shaft 33a. The drum 33, at its upper end, is closed by a dome-shaped top 35 and at its lower end it opens into a funnel-shaped discharge member 36. The drum 33 is positioned concentrically within a larger steel drum 37, and it is maintained in spaced relationship therewith by a plurality of stay-bolts 38 to provide a water jacket 39. To avoid heat losses from the furnace, the outer drum 37 may be provided with a coating 43 of any suitable insulating material. At its lower end, the inner drum 33 may be provided with a water screen 45 comprising a plurality of U-shaped tubes which open from the water jacket 39 and project partway across the shaft 33a. The jacket 39 and the screen 45 are filled with water save for a space 40 which serves as a steam chamber above the level of the dome-shaped top 35 on the inner drum 33, a feed water pump or injector 41 being provided so that this condition may be maintained during operation. At its upper end, the outer drum 37 is provided with a pipe 42 which leads steam that may be created during operation to a place of utilization. The pressure within the jacket 39 set up by the formation of steam may be controlled in any suitable manner, a control valve being indicated diagrammatically at 42a for this purpose.

The main feed pipe 26 opens into the lower part of the furnace shaft 33a and it is provided with a discharge nozzle 46 constructed and arranged to direct the incoming stream of preheated air and finely divided solids upwardly through the central portion of the shaft towards the dome-shaped top 35. Near the top of the shaft 33a, however, the back pressure created by the upwardly flowing stream, aided by the dome-shaped top 35, causes the stream to mushroom outwardly in a violently turbulent manner and reverse its direction of flow, thereby causing the gases and the solids suspended therein to travel downwardly at a slower rate of speed but still in a turbulent condition about the upwardly flowing center stream into the funnel-shaped bottom member 36 which serves to converge them into a single stream and to direct this stream through a pipe 47 into a separator 48.

The dimensions of the furnace shaft 33a, and the composition of the stream discharged therein are such that by the time the direction of flow is reversed a reducing atmosphere containing free carbon prevails and at temperatures below the fusion or melting temperatures of iron but sufficiently high to reduce the metal bearing particles to the state desired, the heat being created by burning a portion of the coal and the reducing atmosphere being created and maintained by an additional portion of the carbon which combines with the oxygen of the air as well as with the carbon dioxide gas released during the reduction of the ore. When starting operations, however, it may be expedient to introduce sufficient air to effect complete combustion of the coal and to so continue until temperatures of 1000° C. or even higher have been attained. Thereafter, the air supply may be curtailed and/or carbon added in excess to promote the formation of a reducing gas predominantly rich in carbon monoxide.

It is to be noted, however, that before any of the materials initially introduced into the furnace shaft 33a can react to produce the desired reducing atmosphere, they may travel through a zone adjacent the nozzle 46 in which there is an excess of free oxygen, a portion of which may combine with impurities such as sulphur, arsenic, zinc or the like which volatilize or enter into chemical combination in gaseous form at temperatures below the reduction temperature of iron and pass off in the form of gaseous compounds which may be recovered from the waste gases by well known means if the quantity thereof is sufficient to warrant such procedure.

Where the direction of flow is reversed during the travel of the stream through the furnace shaft 33a, the solid particles move violently and turbulently while in heated gaseous suspension and so constantly expose their surfaces to the reacting media with the result that the ore bearing particles are reduced to substantially the desired state in this zone. As the gases and the solids travel downwardly through the furnace shaft about the upwardly flowing center stream, through the funnel-shaped member 36 and pipe 47 into the separator 48, the gases are still reducing in nature, and free carbon is present in the stream. At the temperatures prevailing the reducing gas in the stream combines with the oxygen of the unreduced ore particles and so reduces them, and the free carbon in the stream combines with the carbon dioxide thus created and so produces additional carbon monoxide, and these reactions continue until substantially complete reduction of the particles is effected. Furthermore, since free carbon in a fine state of subdivision is present in the stream a film of soot is precipitated on the confining walls which effectively prevents the reduced particles from sticking to these walls, particularly since the reduced particles are moving in a large volume of gas. In addition, the screen 45 and the walls of the shaft 33a, being water-cooled, are considerably below the temperature of the reduced particles, with the result that when reduced particles come into contact with these surfaces they are chilled to an extent such that they will not stick or adhere hereto. Also, the chilling effect exerted by the cooled surfaces of the furnace lowers the temperature of the gases during their course of travel to the separator 48 and this acts, as stated heretofore, to slow down the velocity of any chemical reactions which might tend to cause the solids to take a less highly reduced form than that previously attained in the furnace.

The separator 48 is so dimensioned and operated that the heavier particles, which are almost entirely iron particles in the event that a substantially completely reduced material is the desired end product, are separated out of the stream as it passes therethrough. From the separator 48 a pipe 50 directs the stream of hot gases with any solids which might remain suspended therein into a second separator 51 which is so dimensioned and operated that these solids, which will be mostly silica and possibly some unrecovered iron particles, are removed from the gas stream. Of course, if no separation of silica or like impurities are intended, one separator may be sufficient.

From the separators 48 and 51, the material thus separated out of the stream may be removed while still in the presence of a reducing atmosphere for further utilization. For example, the material from the separator 48 may be led directly to a melting furnace 32 while the material from the separator 51 may be led directly to a collector 44 from which any remaining values may be recovered. If desired, of course, the reduced particles from the separator 48 may be placed in canisters and sealed, or they may be compressed and stored.

From the separator 51 a heat insulated pipe 52 leads the hot gases to the recuperator furnace 28 on which rests the air preheater 27 wherein, as stated heretofore, the blast of air created by the blower 29 is preheated near to or even above the ignition temperature of the reducing agent prior to its discharge into the furnace shaft 33a. The recuperator and preheater arrangement is preferably of the type that uses some of the sensible heat of the returned hot gases and some of its calorific value, the air necessary for combustion being introduced from the pipe 30 leading from the blower 29 into the pipe 52 which returns the hot gases to the recuperator 28 through a small duct 54 having a valve or damper 55 for controlling the amount of air thus introduced into the hot waste gases. From the preheater 27, the hot waste gases may be led off through a heat insulated pipe 53 for further utilization. In the event the heat thus recovered from the waste gases is more than that required for preheating purposes, some of the gases may be withdrawn from the return pipe 52 by means of a heat insulated branch pipe 52a having a cutoff valve 52b and conducted, if desired, to suitable apparatus for further effective utilization. And, in the event the heat thus recovered from the waste gases is less than that required for preheating purposes, the additional heat required may be supplied from a suitable outside source.

If need be, additional reducing agent may be injected into the stream at one or more places along its course of travel through jets 56 to insure that the gases remain reducing in nature during and after the period of reaction. Also, additional preheated air alone or mixed with powdered coal may be injected into the stream in like manner, if necessary, to maintain the temperature thereof at desired values.

The jets 56 lead inwardly through the walls of the furnace from a pair of heat insulated headers 57, 58 which surround and which are supported by the outer insulated wall 43, and they may be directed either radially or at an angle to the radius of the shaft 33a. A pair of branch pipes, 60, 61 having control valves 62, 63 lead from the headers 57, 58 and join into a single pipe 59 having a main control valve 59a which opens into the main feed pipe 26 at a point ahead of the place where the preheated air is mixed with the solids. In like manner a second pair of branch pipes, 65, 66 having control valves 67, 68 lead from the headers 57, 58 and join into a single pipe 64 having a main control valve 64a which opens into the main feed pipe 26 at a point beyond where the solids are mixed with the preheated air. Also, in like manner, a third pair of branch pipes 74, 75 having control valves 76, 77 open from the headers 57, 58 and terminate in a single pipe 73 which communicates with the outlet of a blower 72, and a pipe 70, having a control valve 71, leads from the waste gas discharge pipe 52 to the inlet side of the blower 72.

In the event it is desired to add reducing gas to the stream of gases and entrained solids during its course of travel through the furnace shaft 33a, the control valves 59a and 64a are closed, the control valve 71 is opened and the blower 72 is rendered operative. Under these conditions, reducing gas is drawn by the blower 72 from the pipe 52, through the pipe 70 and then blown through the pipe 73 and branches 74, 75 into the headers 57, 58 from whence it is discharged into the furnace shaft 33a through the jets 56. Of course, if the waste gases leading from the separators are not sufficiently reducing in nature, additional reducing gas may be provided, and it may be created in whole or in part by injecting into the shaft 33a through the jets 56 from a suitable source (not shown) powdered coal together with a supply of air insufficient to effect complete combustion of the coal or it may be supplied in whole or in part through the jets 56 from a suitable outside source (not shown). Also, if it is desired to simply introduce additional preheated air into the shaft 33a to raise the temperature therein, the control valves 64a and 71 are closed and the control valve 59a is opened. And, if it is desired to add preheated air, reducing agent and ore the control valves 59a and 71 are closed and the control valve 64a is opened. It is to be noted that all the valves are so arranged as to enable the auxiliary jets 56 to be fed from any one source separately, or in any combination desired. Also, it is to be understood that additional jets may be placed at other heights of the furnace if desired or necessary to obtain the desired control. In addition, steam or water in the form of a fine spray may be introduced into the stream if need be through suitable injectors (not shown) to aid and maintain a reducing gaseous atmosphere.

As stated heretofore, the cooling effect created by the water cooled walls of the furnace aids in maintaining a reducing atmosphere in the furnace, this being true by virtue of the fact that as the temperature of the stream decreases the amount of carbon monoxide needed to maintain gaseous equilibrium is decreased. In consequence, by properly cooling the stream it is thus possible to obtain a desired degree of reduction with a minimum amount of fuel. Furthermore, by properly cooling the stream it is possible to obtain a separation of the reduced particles from the stream as it passes through the separator substantially free of carbon. For example, at the elevated temperatures at which the major portion of the reduction is effected in accordance with this invention, the volume of carbon monoxide needed to maintain gaseous equilibrium pressure in the reaction of the ore with carbon monoxide is considerably less than that needed to maintain gaseous equilibrium pressure in the reaction of the carbon with the carbon dioxide gas given off by the ore. Under the conditions just stated free carbon must be present in the stream to maintain a reducing atmosphere. As the temperature of the stream falls below 800° C., however, the volume of carbon monoxide needed to maintain gaseous equilibrium pressure in the reaction of the ore with the carbon monoxide rapidly approaches that needed to maintain gaseous equilibrium pressure in the reaction of the carbon with the carbon dioxide in the stream, and at approximately 720° C. these values are substantially the same. When the volume of the carbon monoxide needed to maintain gaseous equilibrium pressure in the ore and carbon monoxide reaction equals the volume of carbon monoxide required to maintain gaseous equilibrium pressure in the carbon and carbon dioxide reaction, no free carbon need be present to prevent back reactions. In consequence, by regulating the amount of carbon introduced into the furnace and by so cooling the stream that it enters the separator in the neighborhood of 720° C. it is thus possible to obtain the desired reduction with a minimum amount of carbon and to separate the reduced material from the stream substantially free of carbon. It is to be noted, however, that it is highly desirable that back reactions be prevented at the time of the separation of the reduced particles from the stream, and to insure that such reactions do not take place, the stream is preferably maintained in the neighborhood of 700° C. to 800° C. at the time of separation and the carbon introduced into the stream is so regulated that at this temperature some free carbon is present in the stream which is capable of reacting with any free oxygen.

Another form of reducing furnace that may be employed is disclosed in Figs. 4 and 5. This furnace consists of vertically disposed steel drums 100, 101 which define a main reduction shaft 102. It will be understood that the outer drum 100 may be insulated to prevent heat losses. These drums are arranged in concentric spaced relationship to form between them a water jacket 103. As in the previously described furnace and for like reasons, the inner drum 101 is provided with a dome-shaped top 104. Within the shaft 102 and substantially concentric therewith is a central chamber 105 having an open upper end. The chamber 105 is defined by a pair of wall members 106, 107 supported from the dome-shaped top 104 by a plurality of tubes 108. These wall members form a water jacket 109. At its lower end, the inner drum 101 is provided with a water screen 110 comprising a number of tubes which project part way across the main reduction shaft and which establish communication between the water jackets 103 and 109. The water jackets 103, 109 and the screen 110 are filled with water save for a space 112 which serves as a steam chamber above the level of the dome-shaped top 104 on the inner drum 101, an inlet pipe 113 leading from a water pump or injector (not shown) being provided so that this condition may be maintained during operation. Tubes 108 permit steam generated in the water jacket 109 to pass to the space 112. At its upper end, the outer drum 100 is provided with a pipe 100a which leads steam that may be created during operation to a place of utilization. The pressure within the jackets 103, 109 set up by the formation of steam may be controlled in any suitable manner, a control valve being indicated diagrammatically at 100b for this purpose. A main feed pipe 114 leads through the side walls of the outer and inner drums 100, 101 at the lower ends thereof, thence upwardly through the bottom walls of the central chamber 105 and terminates in a discharge nozzle 115 adapted and arranged to direct an incoming stream of highly preheated air, reducing agent and finely divided particles of material to be treated upwardly through the centrally disposed chamber 105 towards the dome-shaped top 104 on the inner drum 101. As the stream of gases and the solids suspended therein near the dome-shaped top 104 it mushrooms outwardly in a violently turbulent manner and then travels downwardly between the water jackets 103, 109 through the water screen 110 and into a discharge pipe 116 which leads to a separator. During this travel of the gases and the solids suspended therein the reduction operation is completed in the manner heretofore explained. To prevent solids which might settle to the bottom of the central chamber 105 from accumulating, the bottom wall of the chamber 105 is provided with a central opening 117 through which these particles are discharged into the outgoing stream.

As in the previously described furnace, and for like reasons, inlet nozzles 118 may be placed at various heights of the furnace.

Also, as in the previously described furnace and for like reasons, most of the reduction takes place in the upper regions of the furnace. The remainder of the reduction takes place as the stream of gases and entrained solids passes downwardly, the cooling effect of the water jackets 103, 109 and water screen 110 serving, as explained heretofore, to maintain a reducing atmosphere and to prevent sticking of the reduced particles.

Still another form of reducing furnace that may be employed in practising the present invention is shown in Figs. 6 and 7. In this furnace a reduction chamber 79 is defined by a vertically disposed steel drum 80 having outwardly bulging top and bottom end closures 81, 82. The drum 80 is disposed concentrically within a larger steel drum 83 and it is maintained in spaced relationship therewith by a plurality of stay bolts 84 to provide a water jacket 85. The water jacket 85 is filled with water save for a space 86 which serves as a steam chamber above the level of the upper end 81 of the inner drum 80, a feed water pipe 87 leading from a water pump or injector (not shown) being provided so that this condition may be maintained during operation. At its upper end, the outer drum 83 is provided with an outlet pipe 88 through which steam created during operation may be led to a place of utilization. The pressure within the jacket 85 may be controlled by a valve 88a located in the pipe 88. In addition, the outer drum is provided with an insulating coating 90 to prevent heat losses.

An inlet pipe 92 leads through the bottom walls of the outer and inner drums 80, 83 and terminates in a globe-shaped discharge nozzle 93 positioned in the lower central portion of the outwardly bulging bottom wall 82 of the inner drum 80. The discharge nozzle 93 is provided with a number of vents or openings 94 which are arranged to direct an incoming stream of reducing agent upwardly adjacent the side walls of the shaft 79 in spiral fashion. A plurality of discharge pipes 95 having funnel-shaped ends 96 lead outwardly through the inner and outer drums 80, 83 and thence to a separator (not shown).

In this furnace, a main feed pipe 97 opens into the upper end of the shaft 79 and it is provided with a discharge nozzle 98 arranged to direct an incoming stream of highly preheated air, reducing agent and finely divided particles of ore downwardly through the central portion of the shaft 79. Near the bottom of the shaft, however, the back pressure aided by the plurality of streams of reducing agent discharged into the shaft through the openings 94 in the discharge nozzles 93 reverses the direction of flow of the stream, thereby causing the gases and the particles suspended therein to travel upwardly in spiral fashion adjacent to the water cooled walls of the shaft to the top of the shaft and thence through the discharge pipes 95 to the separator. In so directing the incoming stream in a downwardly directed blast, reversing its direction of flow, and then causing it to be directed upwardly about the downwardly flowing center stream in spiral fashion a violently turbulent effect is created which in causing rapid relative movement between the solids and the highly heated gases brings about the desired degree of reduction in the manner heretofore explained.

From the foregoing it will be apparent that we have produced a highly efficient method of reducing or beneficiating metal bearing materials in which fuel losses are reduced to a minimum, and have also devised novel forms of furnaces wherein the reducing operations may be conducted efficiently. Furthermore, it should be observed that the temperature control of the character described can only be obtained by means of liquid cooling of the walls inasmuch as the temperature of the furnace walls is controlled by the boiling point of the water within the walls. This differs from air cooling or other gaseous cooling means for the reason that with air or gas cooling the temperature of the walls may vary at different heights of the shaft depending entirely upon the temperature in the shaft at that particular height. As a consequence, nonuniformity in temperature is always present with air or gas cooled or with uncooled walls.

While in many instances it may be desirable to entirely water jacket the furnace walls, as in the embodiments shown, the most important portion to maintain cooled at an even and relatively low temperature is the portion past which the gases flow after the major portion of the desired reduction has taken place. In other instances, however, particularly when the reducing gas is created within the reduction chamber, it may be desirable to omit the water jacketing from around those parts of the furnace shaft in which the higher reacting temperatures are necessary or desirable or to shield those parts against the cooling actions of the water cooled walls as by a refractory lining (not shown).

While in the furnace structures shown, the powdered coal, preheated air and powdered ore are introduced into the furnace shaft through a common inlet pipe it is to be understood that equally favorable results may be obtained by introducing them concurrently through a multiplicity of inlet pipes or singly or in any desired combination through a multiplicity of pipes, and that these pipes may be located at the same or different levels, the essential feature in all cases being that the material to be reduced is treated in a turbulent stream of reducing gas and that it is entrained by and carried concurrently therewith through and out of a reducing zone.

Also, while in the furnace structures shown the reducing gas is created in the furnace, it may be injected into the furnace from an outside source as heretofore explained. In addition, it is to be understood that free carbon is needed primarily in the stream to insure the presence of a reducing gas atmosphere and at desired reaction temperatures. In consequence in many instances, particularly when synthetic or manufactured reducing gas is introduced into the furnace from an outside source it is possible to maintain a sufficiently high ratio of carbon monoxide to carbon dioxide during and after the reaction and without the addition of excess free carbon.

Also it will be understood that there may be many other variations in the form of furnace used in practising the process. Therefore, the above described embodiments of the invention should be considered as illustrative only and not as limiting the scope of the following claims.

What is claimed:

1. A method for the treatment of iron ores and other materials consisting essentially of compounds of iron which comprises forcing the material to be treated in finely divided state through a reducing zone in suspension in a carbonaceous gaseous atmosphere of reducing nature, cooling the atmosphere in said zone to limit the maximum temperature therein to that required to reduce said material to metallic powder and to provide an exit temperature of said atmosphere and the solid material suspended therein from said zone of between approximately 700° C. and 800° C., and separating said solid material from said gaseous atmosphere at a temperature between 700° C. and 800° C.

2. A method for the treatment of iron ores and other materials consisting essentially of compounds of iron which comprises forcing the material to be treated in finely divided state through a reducing zone in suspension in a carbonaceous gaseous atmosphere of reducing nature cooling the atmosphere in said zone to limit the maximum temperature therein to that required to reduce said material to metallic powder and to provide an exit temperature of said atmosphere and the solid material suspended therein from said zone of between approximately 700° C. and 800° C., separating said solid material from said atmosphere at a temperature between 700° C. and 800° C., and utilizing heat from the separated gases to preheat the air introduced into said zone to a temperature at least as high as approximately the ignition temperature of said carbonaceous material.

3. A method of reducing ferrous ores and the like which comprises passing a stream of finely divided particles of material to be treated, free carbon, and a gaseous reducing agent capable of reacting with a metallic oxide to produce carbon dioxide through a reducing zone in a turbulent manner and at temperatures sufficient to cause the reducing agent to react with the material to produce metallic iron powder and the free carbon to combine with the carbon dioxide thus formed to produce carbon monoxide, thereafter cooling said stream to temperatures between approximately 700° C. and 800° C., and then separating the iron powder from said stream while the temperature of said stream is between 700° C. and 800° C.

4. A method of reducing ferrous ores and the like which comprises passing a stream of finely divided particles of material to be treated, free carbon, and a gaseous reducing agent capable of reacting with a metallic oxide to produce carbon dioxide through a reducing zone in a turbulent manner and at temperatures sufficient to cause the reducing agent to react with the material to produce metallic iron powder and the free carbon to combine with the carbon dioxide thus formed to produce carbon monoxide, progressively cooling said stream to temperatures of between 700° C. and 800° C., and then separating the reduced particles from the stream at a temperature between 700° C. and 800° C.

5. In a furnace for the treatment of metallic ores and the like, the combination of a furnace shaft having a closed end, means for directing a stream of material to be treated and reducing agent through the central portion of said shaft towards the closed end thereof to reduce the material to metal, a water jacket surrounding at least a portion of the walls of said shaft for cooling the same, and a discharge port for withdrawing the reduced metal from the shaft.

6. In a furnace for the treatment of metallic ores and the like, the combination of a furnace shaft having a closed end, means for directing a stream of material to be treated and reducing agent through the central portion of said shaft towards the closed end thereof to reduce the material to metal, water cooled means extending partially across the shaft for cooling said stream out of contact with the water, and a discharge port for withdrawing the reduced metal from the shaft.

7. In a furnace for the treatment of metallic ores and the like, the combination of a vertical furnace shaft having metal walls and a closed upper end, means for directing a stream of material to be treated and reducing agent upwardly in said shaft to reduce the material to metal, means for liquid cooling said walls to regulate the composition and temperature of said stream, and a discharge port for withdrawing the reduced metal from the furnace.

8. In a furnace for the treatment of metallic ores and the like, the combination of a vertical furnace shaft having a closed upper end, means for directing a stream of material to be treated and reducing agent upwardly in said shaft to reduce the material to metal, a water jacket surrounding at least a portion of the walls of said shaft, and a discharge port leading from the lower portion of the shaft for withdrawing gases and the reduced material therefrom.

9. In a furnace for the treatment of metallic ores and the like, the combination of a vertical furnace shaft having a closed upper end, means for directing a stream of material to be treated and reducing agent upwardly through said shaft to reduce the material to metal, water cooled means located in the lower portion of said shaft for cooling said stream out of contact with the water, and a discharge port leading from said shaft below the level of said water cooled means for withdrawing gases and the reduced material therefrom.

10. In a furnace for the treatment of metallic ores and the like, the combination of a vertical furnace shaft having a closed upper end and consisting of walls having high heat transfer properties, means for directing a stream of material to be treated and reducing agent upwardly through said shaft to reduce the material to metal, a water jacket surrounding at least a portion of the walls of said shaft, water cooled means located in the lower portion of the shaft for cooling said stream out of contact with the water, and a discharge port leading from said shaft below the level of said water cooled means for withdrawing gases and the reduced material therefrom.

11. In a furnace for the treatment of metallic ores and the like, the combination of a vertical furnace shaft having a closed upper end and consisting of material having high heat transfer properties, means for directing a stream of material to be treated and reducing agent upwardly through said shaft to reduce the material to metal, a water jacket surrounding at least a portion of the walls of said shaft, water cooled means located in the lower portion of the shaft for cooling said stream out of contact with the water, an auxiliary jet leading into said shaft above the level of said water cooled means, and a discharge port leading from the shaft below the level of said water cooled means.

12. In a furnace for the treatment of metallic ores or the like, the combination of a vertical furnace shaft having a closed upper end and consisting of material having high heat transfer properties, a main feed pipe opening into said shaft at the low end thereof, a discharge nozzle carried by said pipe and adapted to discharge an incoming stream of material to be treated, fuel and air upwardly through said shaft in mushroom fashion to reduce the material to metal, a water jacket surrounding at least a portion of the walls of said shaft, water cooled means located in the lower portion of said shaft for cooling said stream out of contact with the water, an auxiliary jet leading into said shaft above the level of said water cooled means, and a discharge port leading from the shaft below the level of said water cooled means.

13. A method for the treatment of iron ores and other materials consisting essentially of compounds of iron in which a gaseous stream of reducing nature having therein particles to be treated which are of such a finely divided nature as to be carried in suspension in said stream is passed through a reducing zone characterized by the fact that the direction of travel of said stream is reversed after its introduction into said zone and in that said stream is subjected to the cooling influence of a liquid cooled surface which defines a portion of the walls of said zone.

14. A method for the treatment of iron ores and other materials consisting essentially of compounds of iron in which a gaseous stream of reducing nature having therein particles to be treated which are of such a finely divided nature as to be carried in suspension in said stream is passed through a reducing zone characterized by the fact that said stream is introduced into said zone in the form of a central blast and reversed within said zone to flow therefrom in the form of an envelope surrounding said central blast and that said envelope is confined by and subjected to the direct cooling influence of liquid cooled walls.

15. A method for the treatment of iron ores and other material consisting essentially of compounds of iron in which a gaseous stream of combustion of reducing nature having therein particles to be treated which are of such a finely divided nature as to be carried in suspension in said stream is passed through a reducing zone characterized by the fact that said stream is cooled from the temperatures of combustion and reaction so as to leave said zone at temperatures in the neighborhood of 700° C. to 800° C. and the solids are substantially separated from the gaseous constituents of the stream after leaving said zone and at said temperatures.

16. A method for the treatment of iron ores and other material consisting essentially of compounds of iron in which a gaseous stream of reducing nature having therein particles to be treated which are of such a finely divided nature as to be carried in suspension in said stream is passed through a reducing zone characterized by the fact that said stream during at least a portion of its path of flow through said zone is in the form of an annulus subjected to the cooling effect of liquid cooled inner and outer confining walls.

17. The method of treating iron ores and other materials consisting essentially of compounds of iron which consists in originating a gas stream reducing in nature in a combustion chamber located in a reduction furnace for flow therefrom through said furnace between the walls of said chamber and the walls of said furnace, and subjecting the material to be treated to reducing action of said stream during its travel between the walls of said chamber and the walls of said furnace.

18. The method set forth in claim 17 characterized in that said stream is cooled during its travel between the walls of said chamber and the walls of said furnace.

19. The method set forth in claim 17 characterized in that the direction of flow of said stream after it emerges from the chamber is reversed to cause the same to travel through the furnace between the walls thereof and the walls of the chamber.

20. In a furnace for the treatment of material having a metallic constituent, the combination of a furnace shaft, a combustion chamber located in said shaft, means for passing a stream of reducing gas and finely divided particles of material to be treated through said chamber and into said shaft for flow therethrough in the form of an envelope about said chamber, and means for cooling the walls of said chamber.

21. Apparatus of the character described comprising means providing a main furnace shaft, means providing a combustion chamber having an open end situated in said shaft and having walls spaced from the shaft walls to provide an annular space around said chamber within said shaft, means providing an outlet for gases from said shaft in a portion thereof remote from the open end of said chamber, means for introducing combustion supporting material into the portion of said chamber remote from its open end to form a gas stream of reducing nature flowing initially through said chamber in one direction and thereafter in the opposite direction through said annular space to the gas outlet of the shaft, and means for introducing finely divided material into said stream to be reduced thereby during its passage through said shaft.

22. In a furnace for the treatment of material having a metallic constituent, the combination of a vertically disposed furnace shaft, a vertically disposed combustion chamber positioned centrally in the lower end of said shaft and opening at its upper end into said shaft, means for passing a stream of reducing gas and finely divided particles of material to be treated upwardly through said chamber and into said shaft for flow therethrough, and means for cooling the walls of said chamber.

23. In a furnace for the treatment of material having a metallic constituent, the combination of a vertically disposed furnace shaft having a closed upper end, a vertically disposed combustion chamber positioned centrally in the lower end of said shaft and opening at its upper end into said shaft, means for passing a stream of reducing gas and finely divided particles of material to be treated upwardly through said chamber and into said shaft for flow upwardly therethrough and thence downwardly between the walls of the shaft and the walls of the chamber, and means for cooling the walls of said shaft and the walls of said chamber.

FRANK HODSON.
PAUL A. HIRSCH.